US005108171A

United States Patent [19]

Spaulding

[11] Patent Number: 5,108,171

[45] Date of Patent: Apr. 28, 1992

[54] APPARATUS FOR MAKING A SERIES OF STATIONARY IMAGES VISIBLE TO A MOVING OBSERVER

[76] Inventor: William J. Spaulding, 2357 Moran Street, Halifax, Nova Scotia, Canada, B3K 4K1

[21] Appl. No.: 597,496

[22] Filed: Oct. 12, 1990

[51] Int. Cl.[5] .......... G03B 25/00

[52] U.S. Cl. .......... 352/100; 352/98

[58] Field of Search .......... 352/100, 98

[56] References Cited

U.S. PATENT DOCUMENTS

| | | | |
|---|---|---|---|
| 917,587 | 4/1909 | Good | 352/100 |
| 978,854 | 12/1910 | Czerniewski | 352/100 |
| 2,026,753 | 1/1936 | Rosenthal et al. | 352/100 |
| 2,299,731 | 10/1942 | Arendt | 352/100 |
| 2,319,287 | 5/1943 | Arendt | 352/100 |
| 3,653,753 | 4/1972 | Mitchell | 352/100 |
| 3,694,062 | 9/1972 | Koenig | 352/100 |
| 3,704,064 | 11/1972 | Sollogoub et al. | 352/100 |
| 3,951,529 | 4/1976 | Gandia | 352/100 |
| 4,179,198 | 12/1979 | Brachet et al. | 352/100 |
| 4,383,742 | 5/1983 | Brachet et al. | 352/100 |

*Primary Examiner*—Monroe H. Hayes
*Attorney, Agent, or Firm*—Hoffman, Wasson & Gitler

[57] ABSTRACT

An apparatus for displaying a series of stationary images to form an animated display when seen from a moving subway train is presented. A series of image display panels are located along a length of subway track. These panels are momentarily illuminated each time a passing train window passes a predetermined point relative to the panel by means of a sensor device attached to each panel. The sensor device detects the presence of a nearby train window by means of a light signal received from each such window. The light signal may be derived either from a source associated with each window or from a reflector associated with each window reflecting light from a source attached to each stationary panel.

22 Claims, 7 Drawing Sheets

APPARATUS FOR MAKING A SERIES OF STATIONARY IMAGES VISIBLE TO A MOVING OBSERVER

BACKGROUND OF THE INVENTION (1) Field of the Invention

The invention relates to an apparatus for displaying a series of stationary images such that they form an animated display when seen by an observer in a moving vehicle in dark places, such as tunnels.

(2) Description of Prior Art

The placement of briefly illuminated, individual images along the route of a subway or other vehicle travelling in a dark place for the purposes of displaying an animated image has been presented in numerous patents including U.S. Pat. Nos. 917,587, 978,854, 3,694,062, 3,704,064, 3,951,529, 4,179,198, and 4,383,742. A variety of light triggering methods and display arrangements are presented in these patents. All the patents discussed below use an image display panel to present the image. The image display panels are mounted on the wall of a darkened place and located in close proximity to the route of a moving vehicle.

U.S. Pat. No. 978,854 (Czerniewski) uses a purely mechanical means of triggering the illumination of the image. A "shoe" attached to the moving vehicle lifts a shutter attached to the subway wall beside the train. A mechanism then permits light to momentarily illuminate the image within the image display panel mounted on the subway wall.

U.S. Pat. Nos. 917,587 (Good) and 4,179,198 (Brachet) use an electro-mechanical means of triggering the illumination of each image. These employ a mechanical device attached to the train which periodically closes an electrical circuit, triggering the illumination of the image within the image display panel.

U S. Pat. Nos. 3,951,529 (Gandia) and 4,383,742 (Brachet) use a determination of the vehicle's speed to trigger image illumination. The former assumes that the train travels at a predetermined speed each time it passes a section of track while the latter measures the train's speed by a radar type speed detector. Many image display panels are triggered to illuminate their images simultaneously.

U.S. Pat. Nos. 3,694,062 (Koenig) and 3,704,064 (Sollogoub) use the light from within the vehicle to trigger image illumination. A light detector associated with each image display panel monitors the light intensity coming from the passing vehicle. When the light shining on the image display panel is of great enough intensity the image is briefly illuminated.

U.S. Pat. No. 978,854 (Czerniewski), previously referred to, uses a stationary miniature image mounted within the image display panel. Light is shone through the miniature image and is magnified through various lenses and directed onto the back of a semi-transparent projection screen by a series of reflectors. The light source is attached to the moving vehicle. All the other patents mentioned above use a large size, back or front lit, image mounted as part of the image display panel.

A major problem with the designs put forward in previous patents is that they do not precisely and reliably trigger image illumination. In order that the observer can clearly see the image, each successive image must be illuminated at exactly the same position relative to the observer. If this process is not precise, the integration of the images will seem blurred. Using light from within the vehicle to trigger image illumination relies on the light reaching the panel-mounted image illumination sensor/trigger being of the same intensity for each image passed. This in turn relies on coordinated and precise panel to panel calibration of all image illumination sensor/triggers so that the light intensity which causes one image illumination to occur will cause image illumination in all image display panels. This method assumes that the calibration can be done economically and that the people observing the animated display do not block the light and thus cause image illumination to occur at different locations from one image display panel to the next. In addition the image will be lit at erroneous times by any light source above the image trigger illumination light threshold. This will include the light coming from the vehicle driver/operator's window. The operator of the vehicle will be distracted by the flashing images causing an unsafe situation.

Triggering methods which employ a determination of the vehicle's speed suffer from illumination accuracy problems as well. It would be very difficult and expensive to measure the speed of the vehicle with enough accuracy to coordinate image illumination and vehicle motion so that a satisfactory display was achieved. For example, a velocity measurement repeatability accuracy of + or −0.014% would be needed to reduce image illuminate location errors to + or −2.0 mm when the vehicle is travelling at 50 km/hr. The high level of accuracy is required to ensure that the image presented is not blurry. Apart from the problem of illumination accuracy this type of animation device suffers from the problem that it illuminates a large number of images at the same time without regard for the position of the observer relative to the image. In many cases the image will be partially obscured from view by window dividers making the presentation unclear and difficult to see.

The mechanical illumination triggering devices, referenced above, have inherent mechanical wear problems because of the high triggering rates and thus are not practical.

Periodically the operator of the animation system will change the images displayed. The large number of images (as many as 1,440 images per minute of display to give the film industry standard 24 frames per second at 50 km/hr) make the preparation and changing of the display images a potentially time consuming and expensive task. Time and expense can be reduced if a miniature transparent image (such as a photographic slide) is used in conjunction with a projection display system mounted inside each panel. Production of a series of miniature images could be accommodated at a low cost by adapting existing video tape or film to the required miniature image size. The size of the miniature image could be chosen so that standard photographic image transfer equipment could be used. The installation time required for the placement of a miniature transparent image inside an image display panel is much shorter than the time required for the installation of a large image of the fully projected size. Thus, using an image display panel equipped with a projected miniature transparent image will reduce ongoing production and maintenance costs. There are, therefore, significant advantages to the use of a projected miniature transparent image.

One of the above mentioned patents incorporates a miniature image and projection system into the image display panel. The major problem with the above mentioned patent is that it requires the light source to be mounted on the moving vehicle. Because the vehicle moves up and down and rocks back and forth the illumination source will not align correctly with the miniature transparent image causing distortion and poor viewing quality. In addition, the optical arrangement outlined in the previously mentioned patent requires much too large an image display panel for the installation to be practical or economical.

SUMMARY OF THE INVENTION

It is therefore, an object of the invention to provide an apparatus to display a series of stationary images such that they form an animated display when seen by an observer in a moving vehicle. The apparatus is made up of a series of images, each one of which is briefly illuminated in precise coordination with a passing observer. When many images are presented in a relatively short interval of time an observer will see an integration of the images. If the pictorial contents of each successive image differs slightly, then the observer will see an animated display.

It is a further objective of the invention to provide a means to precisely coordinate the illumination of each image with the moving observer using a coded signal. Two arrangements are presented. In the first, a coded signal emanates from a signal source mounted on or near each of the vehicle's passenger windows. As the vehicle moves past an image display panel the coded signal strikes the signal receiver/decoder. The signal is decoded and the image is briefly illuminated thus making the image visible to the observer. In the second arrangement, a coded signal emanates from each stationary image display panel. As the vehicle moves past an image display panel the coded signal strikes a reflector array mounted on or near each of the vehicle's passenger windows which reflects the coded signal back toward the image display panel in a rapidly oscillating fashion. The reflected coded signal is received and decoded by the signal receiver/decoder mounted within the image display panel. Upon reception of the coded signal and its subsequent decoding, the image is briefly illuminated thus making the image visible to the observer. Either method of coordinating image illumination with the passing observer can be used with either manifestation of the image display panel presented below.

A further objective of the invention is to provide a means of producing a display using an image display panel in which a brief burst of light is reflected onto the back of a large transparent display image by a series of reflectors. The transparent display image is like that used in many advertising rear lit board displays. When lit from the rear, the images displayed on the transparent display image are clear to an observer looking at its front side.

A further objective of the invention is to provide a means of producing a display using a miniature transparent image, such as an ordinary photographic slide. A short burst of light is focused through the miniature image, then focused by a set of lenses and is finally projected onto an angled screen which can be seen by the observer. The projection screen and transparent image are shaped such that an observer in a passing vehicle can see the focused projected image without distortion.

A further objective of the invention is to provide an alternate means of producing a display using a miniature transparent image, such as an ordinary photographic slide. A short burst of light is directed through the miniature image, focused by a set of lenses, deflected by a mirror, and is finally projected onto an angled screen which can be seen by the observer. The projection screen, mirror and transparent image are shaped such that an observer in a passing vehicle can see the focused projected image without distortion.

A further objective of the invention is to group many components into easily removable modules within each section of the image display panel. The modular construction allows maintenance, repair and calibration operations to be performed in a repair shop away from the tunnel environment, reducing maintenance costs to a minimum.

There is thus disclosed an apparatus for displaying images for viewing from within a moving vehicle such as a subway train travelling in a darkened area including a plurality of image display devices for placement at uniform height alongside the route of the vehicle for displaying images, each image display device comprising an image display area, image illumination means for momentarily illuminating the image display area, light signal source means for emitting a light signal in the direction of an adjacent window of the vehicle, and light detector means for detecting a desired reflection of the light signal from the vehicle and triggering the image illumination means; and light reflection means for mounting on the vehicle in relationship to at least one of the windows of the vehicle to reflect light from the light signal sources to their associated sensing means, whereby continuous images are perceived by an observer from within the moving vehicle.

BRIEF DESCRIPTION OF THE DRAWINGS

The invention will now be described in greater detail with reference to the embodiments of the invention, given by way of example only, in the annexed drawings in which.

DESCRIPTION OF PREFERRED EMBODIMENTS

Figure 1:
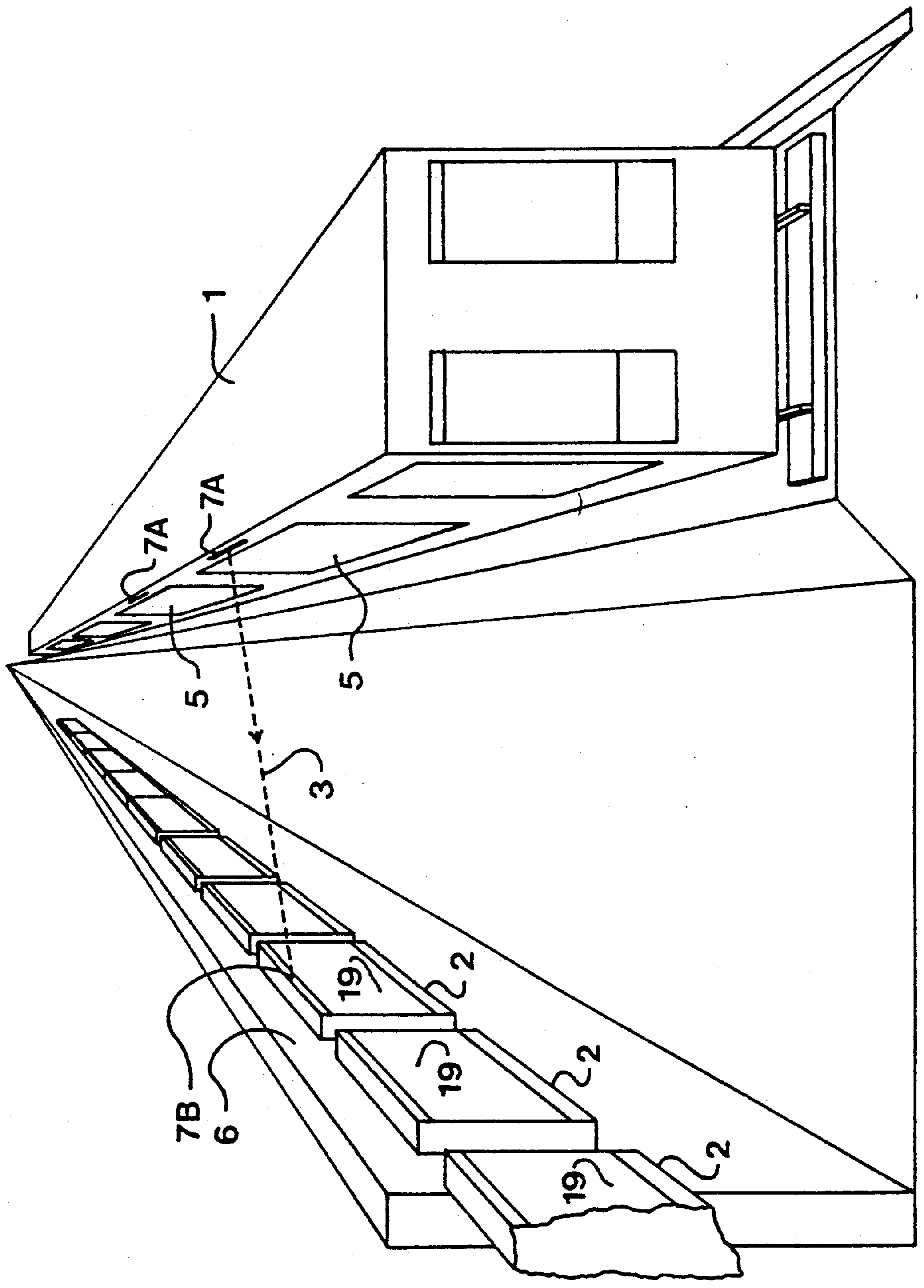
FIG. 1 is a perspective diagrammatic view of an installation according to the invention.
Figure 6:
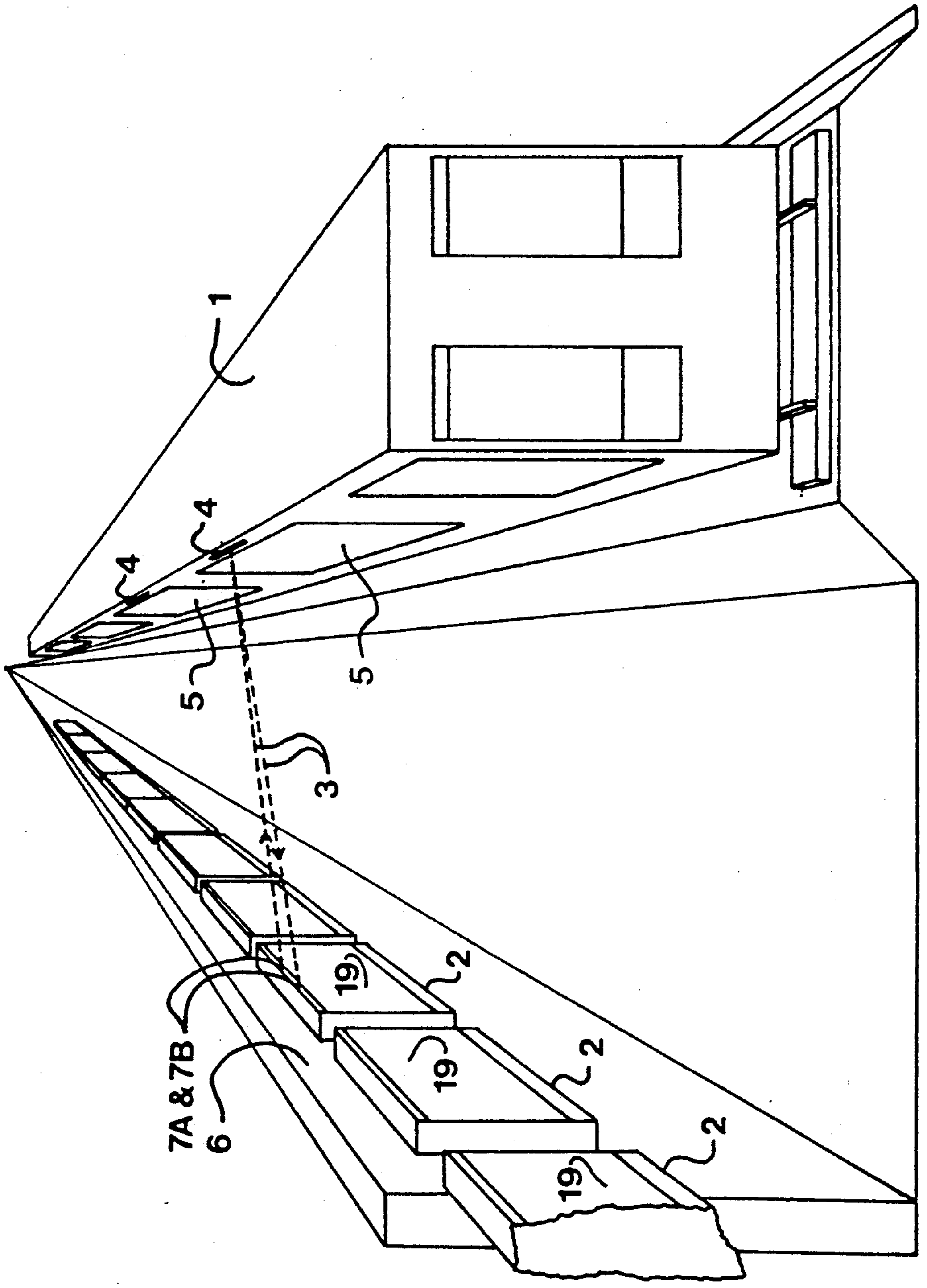
FIG. 6 is a perspective diagrammatic view of an alternate installation according to the invention.

FIG. 1 and FIG. 6 show two typical installations. A vehicle 1 (a subway train in this case) travels through a dark tunnel. On the wall of the tunnel 6 numerous image display panels 2 are mounted. In FIG. 1 a coded signal source 7A is mounted on the vehicle 1 on or near each passenger window 5 and a coded signal receiver/decoder 7B is mounted within the image display panel 2. In FIG. 6 both the coded signal source 7A and the coded signal receiver/decoder 7B are mounted within the image display panel 2, and a reflector array 4 is mounted on the vehicle 1 on or near each passenger window 5.

Figure 10:
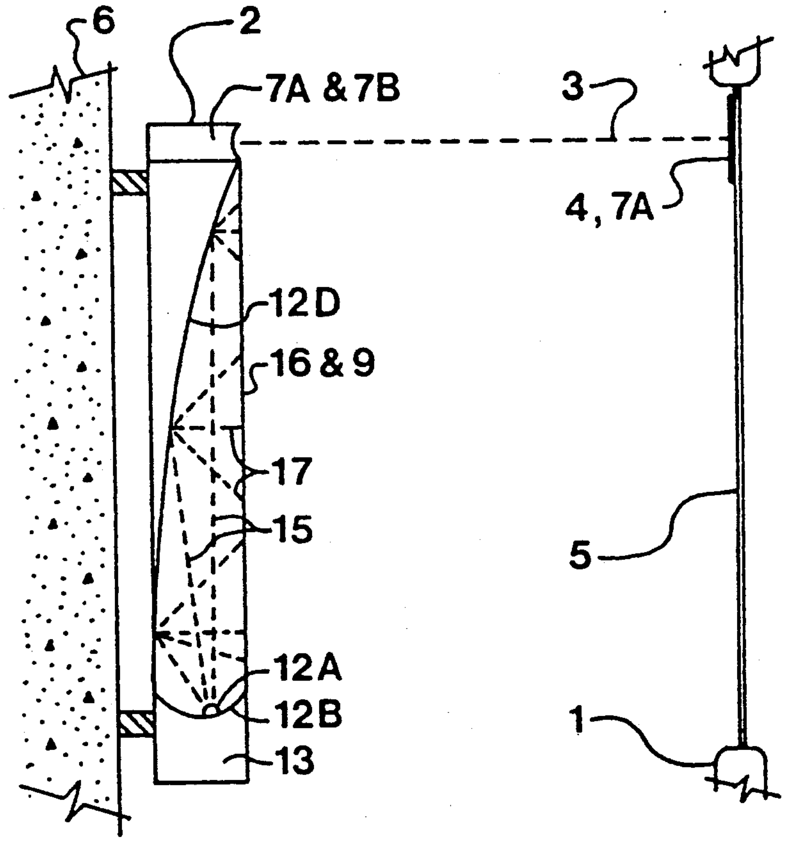
FIG. 10 is a diagrammatic sectional view of the image display panel arrangement according to one embodiment of the invention.
Figure 11:
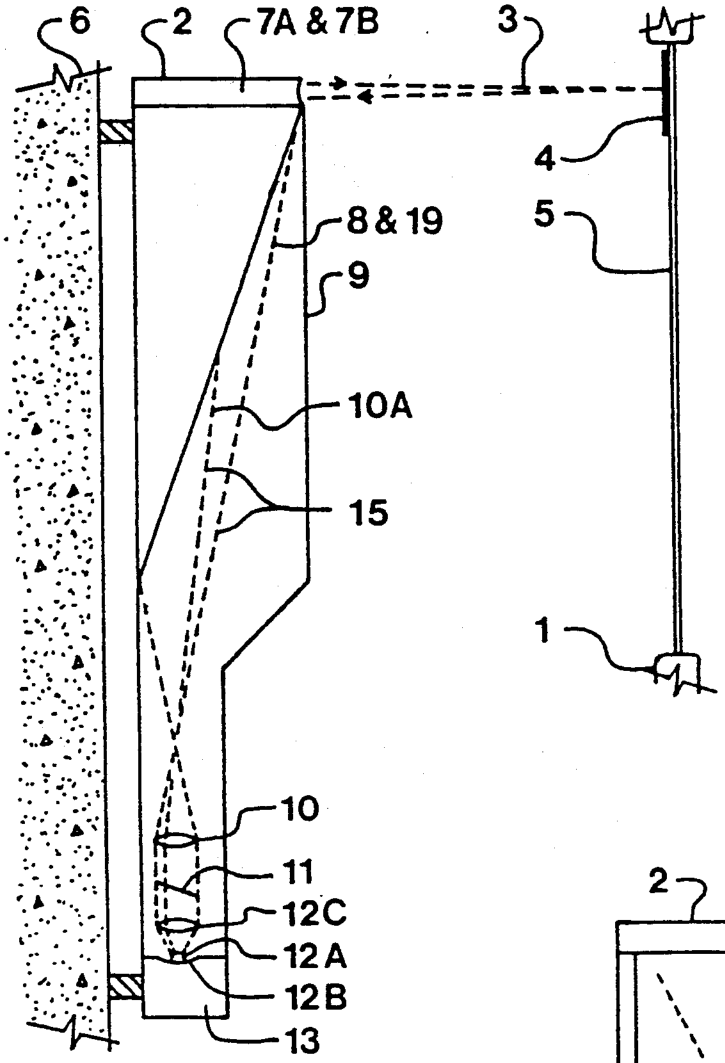
FIG. 11 is a diagrammatic view of an alternate embodiment of the image display panel arrangement according to another embodiment of the invention, and, FIG. 12 is a diagrammatic view of another alternate embodiment of the image display panel arrangement according to another embodiment of the invention.
Figure 12:
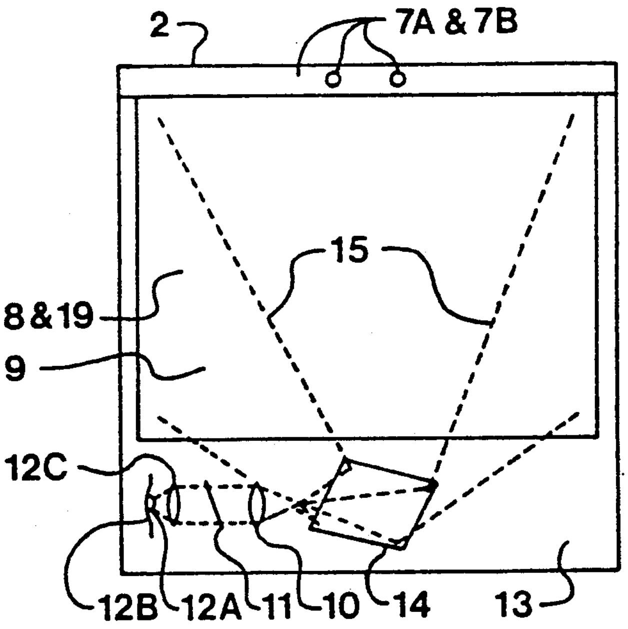

Three embodiments of the image display panel 2 are presented in FIG. 10, FIG. 11 and FIG. 12. Each image display panel 2 is divided into three functional sections: the coded signal section; the illumination triggering section; and, the image display section. Two embodiments of the coded signal section are also presented, each one of which can be used in any one of the image display panel 2 embodiments presented. The coded signal section is made up of the coded signal source 7A and the coded signal receiver/decoder 7B. The illumination triggering section 13 is the electronic driver for the image illuminating light source (strobe lamp(s)) 12A. The remaining image display panel 2 components make up the image display section.

In the embodiment illustrated by FIG. 1 there is a coded signal source 7A mounted on or near each passenger window 5 of vehicle 1 and the coded signal receiver/decoder 7B is installed within each image display panel 2. A coded signal 3 of pulsed infrared light is continuously generated by the coded signal source 7A. The coded signal 3 is directed outward from the side of the vehicle 1 in a perpendicular direction toward the tunnel wall 6. When the coded signal source 7A moves into a position directly in front of the image display panel 2, the coded signal 3 enters the coded signal receiver/decoder 7B. As soon as the coded signal 3 has been received and decoded, the image 16 shown in FIG. 10 or the projected image shown in FIG. 11 and FIG. 12, is briefly illuminated. Each image (16 or 19) illumination is of such a short duration that, to an observer within the vehicle 1, the image does not appear to move and is observed with clarity. As outlined below, the coded signal receiver/decoder 7B is of such a design that it will only respond to signals produced by the coded signal source 7A mounted on or near the window 5—other sources of light and infrared light will not trigger image illumination.

Figure 2:
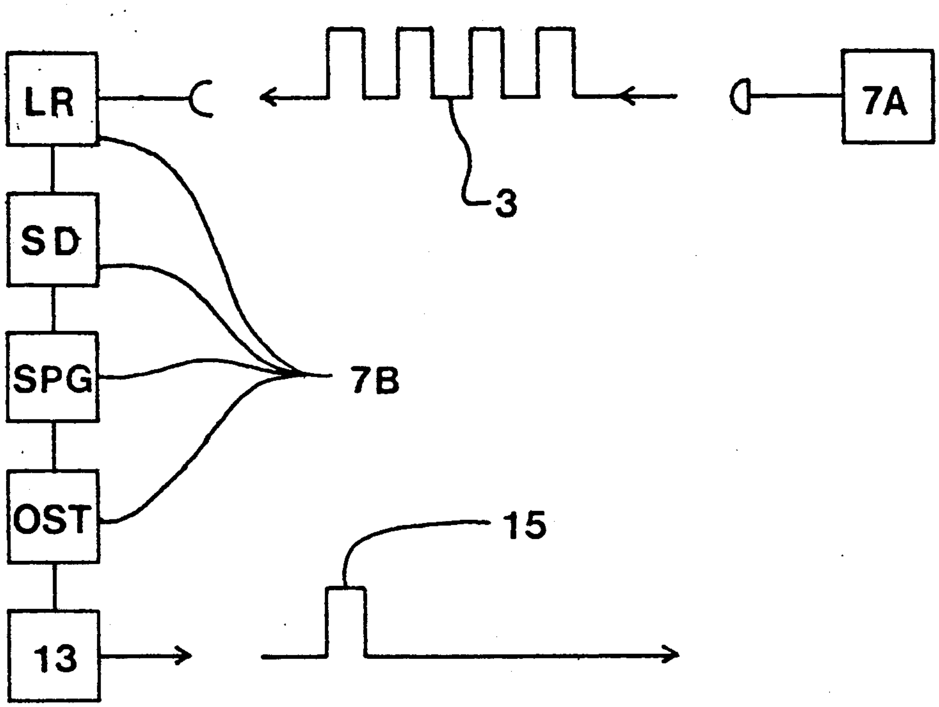
FIG. 2 is a schematic diagram of an apparatus for triggering image illumination.

For the purposes of the present discussion, it is to be understood that the light source may be 'coded' simply by switching it on and off at a predetermined rate, as illustrated in FIG. 2. Alternatively, if necessary, the light source may further encode the light digitally in a predetermined fashion to further uniquely identify the source of the light. In either fashion, the coded light source 7A continuously generates an infrared coded light signal 3.

FIG. 2 schematically illustrates the functional elements of the coded signal source 7A, the coded signal receiver/decoder 7B, and the strobe light pulse generator 13. In the preferred embodiment, to code the infrared light signal 3 the coded light source 7A turns on and off an infrared light emitting diode at a frequency of not less than approximately 25 kHz. The coded signal 3 frequency of 25 kHz was chosen to allow at least 10 full cycles to be returned to the infrared signal receiver/decoder 7B during the short time that the coded signal source 7A is within the field of view of the receiver/decoder 7B. This number of received infrared coded signal 3 cycles ensures reliable decoding of the coded signal. The coded light signal 3 is detected by the coded signal receiver/decoder each time the coded light source generator, located on the moving vehicle 1, moves past the image display panel 2. When infrared light is detected by the light receiver LR an alternating current electrical signal with a frequency corresponding to that of the infrared light detected is sent to the coded signal decoder SD. When the frequency of the alternating current electrical signal is that of the coded light signal 3 the coded signal decoder SD causes the single pulse generator SPG to send one pulse of electrical current to the optocoupler strobe trigger OST. The optocoupler strobe trigger OST acts as a link between the high voltage strobe light pulse generator 13 and the lower voltage coded signal receiver/decoder 7B. The single electrical pulse input to the optocoupler strobe trigger OST causes the strobe light pulse generator 13 to illuminate the strobe lamp(s) 12A for one burst of a very short duration.

The selection of the correct coded light signal 3 frequency is very important. The frequency is chosen so that it differs from other sources of infrared light within view of the light receiver LR. In addition, the coded signal frequency must be such that enough infrared light on-off cycles are detected during the short period that the coded signal source 7A is in view of the light receiver LR to allow accurate and reliable signal decoding.

Figure 3:
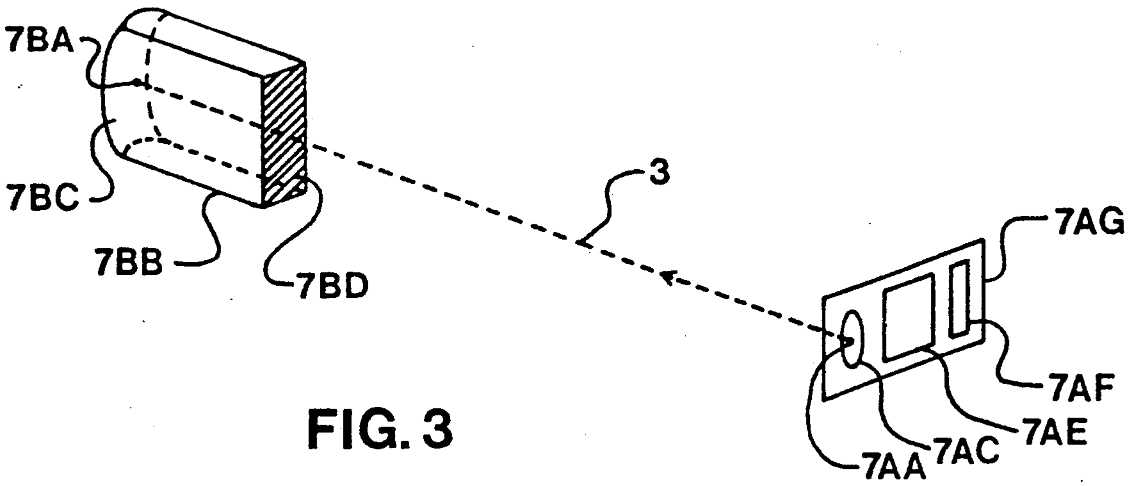
FIG. 3 is perspective diagrammatic view of an apparatus for the coordination of image illumination and observer.
Figure 4:
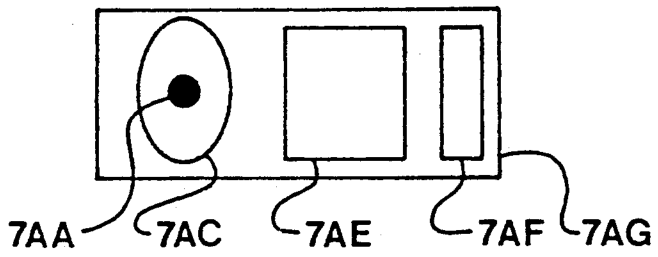
FIG. 4 is a diagrammatic elevation view of a coded signal source for attachment to a vehicle.
Figure 5:
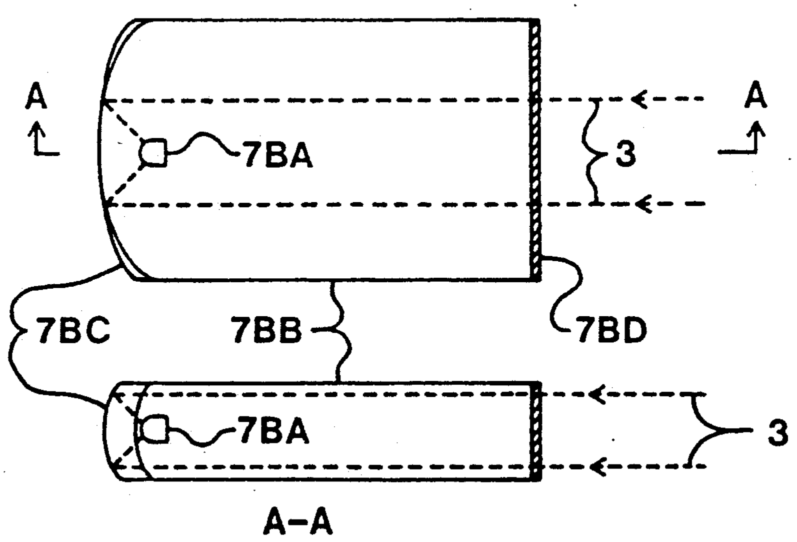
FIG. 5 is a diagrammatic plan and elevation view of a coded signal receiver for installation inside an image display panel.

FIG. 3, 4 and 5 illustrate the coded signal source 7A, the coded signal receiver/decoder 7B, and the manner in which these two components are arranged to produce image illumination triggering. In one embodiment, the infrared light source 7A is mounted on the vehicle 1. Infrared light is generated by an infrared light emitting diode 7AA which is driven by electronic pulse generator 7AE. The electronic pulse generator 7AE is powered by a battery 7AF or by power supplied by the vehicle itself. Battery life is maximized by minimizing the proportion of each on-off pulse cycle that the infrared light emitting diode 7AA is on. For a pulse frequency of 25 kHz the infrared light emitting diode 7AA will turn off and on once every 40 ms. During the 40 ms cycle, if the infrared light emitting diode 7AA is on for only 10 ms, then for 75% of each cycle a minimum of electricity is drawn from the battery. Thus battery life is extended compared with a continuously illuminated light source. This will reduce battery replacement costs significantly.

The coded signal 3 generated by the infrared light emitting diode 7AA is projected in an essentially perpendicular direction away from the vehicle 1 by a parabolic light reflector 7AC placed behind the infrared light emitting diode 7AA. In addition to being parabolic, the shape of the reflector 7AC is elliptical when viewed from the front as seen in FIG. 4 with the major axis of the ellipse oriented vertically. By shaping the reflector 7AC in this way most of the infrared light which makes up the coded signal 3 will be projected away from the side of the vehicle in a flattened predominantly vertical lobe and will tend to fall on an area of the tunnel wall 6 which has a width less than that of one image display panel 2. Thus, each coded signal will trigger the illumination of only one image at a time. The infrared light emitting diode 7AA, the reflector 7AC, the electronic pulse generator 7AE and battery 7AF are all mounted onto a plastic base 7AG which is equipped with a self adhesive backing so that the entire assembly making up the coded light source 7A can be easily mounted onto the vehicle 1.

The coded light receiver 7B is mounted within the image display panel 2 and is arranged such that it can "see" only a small area on the side of the vehicle. Thus, as the vehicle passes, the coded light source 7A must be within the "field of view" of the coded signal receiver 7B for image illumination to occur. The distance from the tunnel wall 6 to the side of the vehicle 1 varies from approximately 400 mm to 900 mm and the "field of view" is approximately 10 mm wide and 100 mm in height. Infrared light enters the coded light receiver 7B through the cover 7BD which is transparent to infrared light but opaque to visible light as is well known, for example, in remote control units for video cassette recorders. Infrared light is directed toward the infrared phototransistor 7BA by a parabolic reflector 7BC. In a preferred embodiment, the shape of the reflector 7BC is rectangular in elevation with the long axis oriented vertically and parabolic in section thus allowing it to focus the infrared light on phototransistor 7BA as seen in FIG. 5 when the source is in the "field of view" of the receiver 7B. The housing 7BB, at the back of which the reflector 7BC and the infrared phototransistor 7BA are mounted, is rectangular in section with its long axis oriented vertically. The function of the housing 7BB is to restrict the amount and direction of light that can enter the infrared receiver 7B. The interior of the housing 7BB has a coating which is non-reflective to infrared light such as flat black paint. All the components which make up the infrared decoder 7B are assembled so that they form a single module which can be removed, serviced and replaced as a single modular unit.

A second main embodiment of the invention is illustrated by FIG. 6. Within each of the image display panels 2 a coded signal source 7A and a coded signal receiver/decoder 7B are installed. A coded signal 3 of pulsed infrared light is continuously generated by the coded signal source 7A. The coded signal 3 is directed outward from the front surface of the image display panel 2 in a generally perpendicular direction toward the vehicle 1. When a reflector array 4, mounted on or near the passenger window 5, moves past a position directly in front of the image display panel 2, the coded signal 3 is reflected back toward the coded signal receiver/decoder 7B. As soon as the reflected coded signal 3 has been received and decoded by the receiver/decoder, the image 19 is briefly illuminated.

Figure 7:
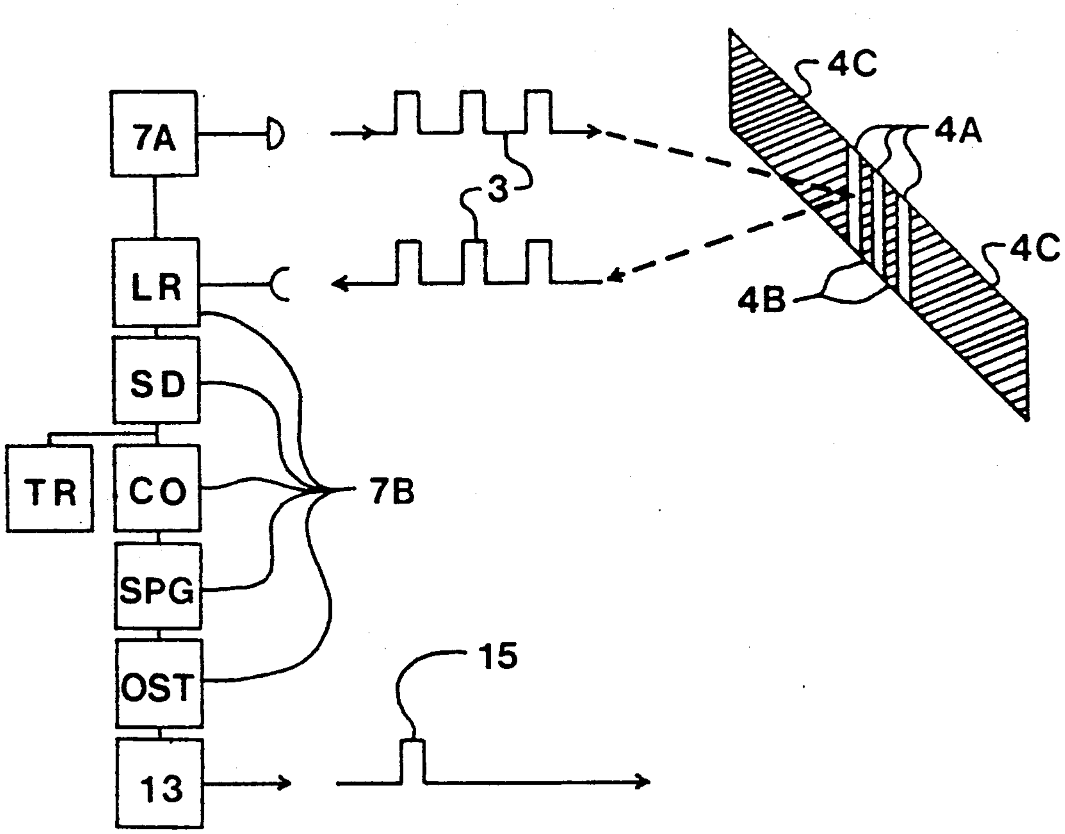
FIG. 7 is a schematic diagram of an alternate apparatus for triggering image illumination.

FIG. 7 schematically illustrates the functional elements of the coded signal source 7A, the reflector array 4, the coded signal receiver/decoder 7B, and the strobe light pulse generator 13. The coded light source 7A continuously generates an infrared coded light signal 3. As described for the previous embodiment, to code the infrared light signal 3 the coded light source 7A turns on and off an infrared light emitting diode at a frequency of not less than approximately 25 kHz. The coded light signal 3 is directed in a generally perpendicular direction outward from the image display panel 2. When the vehicle 1 passes the image display panel 2 the coded light signal 3 is reflected back toward the image display panel 2 by the side of the vehicle 1.

Most surfaces are to some degree able to reflect infrared light so the infrared light receiver LR will be constantly receiving varying intensities of reflected coded infrared light 3. In order to distinguish the coded light signal from ambient received signals, a special method of detection of the signals is required. When infrared light is detected by the light receiver LR an alternating current electrical signal with a frequency corresponding to that of the infrared light detected is sent to the coded signal decoder SD. When the frequency of the alternating current electrical signal is that of the coded light signal 3 electrical current flows from the coded signal decoder SD output to the counter CO. When the intensity of the reflected coded signal 3 drops below a certain level then current flow to the counter CO is halted and the counter CO is readied for the next increment.

When a pre-set number of counts, such as three, have been recorded by the counter CO electrical current flows from the output of the counter CO to the single pulse generator SPG causing it to send one pulse of electrical current to the optocoupler strobe trigger OST. The optocoupler strobe trigger OST acts as a link between the high voltage strobe light pulse generator 13 and the lower voltage coded signal receiver/decoder 7A and 7B. The single electrical pulse input to the optocoupler strobe trigger OST causes the strobe light pulse generator 13 to illuminate the strobe lamp(s) 12A for one burst of a very short duration. The image 19 is thus briefly illuminated.

A timed reset TR is associated with the counter CO. The timed reset TR periodically resets the accumulated count of the counter CO back to zero so that the count will proceed from the beginning. The timed reset TR time-out sequence is started when a coded signal 3 is received, decoded and electrical current flows from the output of the coded signal decoder SD. Once the timed reset TR time-out sequence has been started, it will run for the full duration and reset the counter CO to zero once the time is up. The timed reset TR will not start another time-out sequence until another coded signal has been received and decoded. The purpose of starting the time-out sequence of the timed reset TR in this way is to coordinate the operation of the counter CO with movement of the reflector. The time between each counter reset is approximately 18 ms. This will allow the images to be illuminated when the vehicle 1 is travelling faster than approximately 30 km/hr.

Providing a timed reset TR which functions in this way will reduce the probability that random infrared reflections coming from the side of the vehicle 1 will cause erroneous image illumination. The coded infrared signal 3 will be reflected off the side of the vehicle 1 with varying intensities and directions depending on the material the vehicle 1 is made of, the surface finish, and how clean the surface is. Typically there will be relatively long sections of the vehicle 1 which will reflect the infrared signal in a more or less uniform fashion. The reflection in this case will be of a long enough duration that the timed reset TR will reset the counter prior to the accumulation of the required count for image illumination. Other parts of the vehicle 1, such as window trim, are effective reflectors which will produce short reflection duration. Window trim typically has only one width followed by a relatively long section of uniform reflectivity. The net effect is that the timed reset will zero the counter before the required number of counts has accumulated for image illumination to occur. There may be reflective patterns on the side of the vehicle 2, such as the vehicle operators logo, which will cause erroneous image illumination. In these cases the number of reflective segments could be altered so that improper image illumination does not occur.

When the reflector array 4 passes in front of the image display panel 2 the reflected coded signal 3 is quite different from the random reflections of the side of the vehicle 1. The reflector array 4 provides a rapidly oscillating reflection sequence which can be decoded. The first segment 4C of the reflector array 4 is quite long in comparison to reflector segments 4A and 4B. Reflector segment 4C is finished with a non-reflective coating and very little of the coded infrared signal 3 is reflected. Thus, a coded signal 3 is not detected by the infrared light receiver LR. The first non-reflective segment 4C allows enough time to pass (at least 18 ms at 50 km/hr) for the timed reset TR to reset the periodic signal counter CO. The timed reset then waits for the first reflected coded signal 3. The next segment 4A of the reflector array 4 is highly reflective and provides a strong reflected coded signal 3 for a short duration (about 3 ms at 50 km/hr but varies with the speed of the train). The counter CO increments once in response and the timed reset begins its time-out sequence. The next segment 4B of the reflector array 4 is non-reflective and the infrared light receiver LR detects no reflected coded signal. This prepares the counter CO to increment at the next reflected coded signal 3 input. In the embodiment presented, three highly reflective segments 4A reflect the infrared coded signal 3 back to the infrared light receiver LR and consequently allow the counter CO to count up to three before the count is reset to zero by the timed reset TR.

In the embodiment described, as soon as the count of three is achieved the image is illuminated, as described in the previous paragraph. In the embodiment shown in FIG. 7, the reflector array has a long non-reflective segment 4C at both ends so that image illumination can occur no matter which way the vehicle is travelling, as the pattern of reflective and non-reflective strips is symmetrical. The highly reflective segments 4A are made from a retro-reflective material.

If it is found that ambient light interference causes any difficulties in detecting the coded light signals accurately, wider or a greater number of reflective panels may be used.

A further method of coordinating the location of the vehicle window 5 and the illumination of the image (16 or 19) is to use a system similar to the bar code readers now in common use in retail stores. The common bar code reader uniquely identifies each product in the store by the use of an infrared light source, a light receiver and a reflector made up of non-reflective and reflective sections. The infrared light source and receiver are moved relative to the reflector and the infrared light receiver produces a series of electrical pulses which correspond to the pattern of reflective and non-reflective bars on the reflector. The pulsed output from the receiver is fed into a microprocessor and the relationship between pulse time spacing intervals is measured and calculations are performed to produce a unique identification of the product being sold. The light receiver electronic circuits used in the bar code reader reduces the interference caused by extraneous light inputs (input noise) and are relatively insensitive to ambient light levels.

Figure 8:
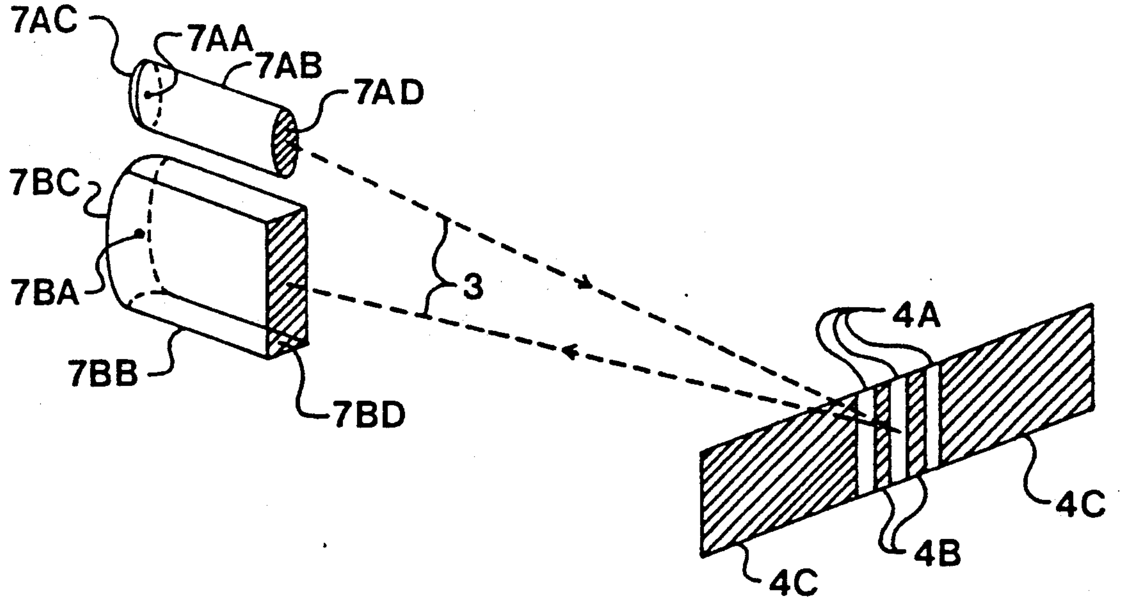
FIG. 8 is a perspective diagrammatic view of an alternate apparatus for the coordination of image illumination and observer.

This common electronic technology can be used to enhance the performance of the embodiment shown in FIG. 8. The light source 7A and light receiver 7B are as described above and the coded light signal 3 will also conform to the description above. The reflector array 4 could be as described above but could also be made with many reflective and non-reflective portions of varying widths. The light receiver 7B (LR shown in FIG. 7) is connected to the signal decoder (SD as shown in FIG. 7). The output of the signal decoder is a square wave voltage signal which varies depending on the nature of the reflected signal. When a coded signal 3 is not reflected or received the voltage output of the signal decoder is low and when a coded signal 3 is reflected and received the voltage output is high. In this embodiment the output of the signal decoder SD is connected to the input of a commonly used bar code decoding microprocessor. When the vehicle 1, equipped with the reflector 4, passes by a light source 7A and light receiver 7B the bar code pattern will be read and identified as the correct pattern and not a random signal input. As soon as the reflector 4 pattern has been identified then the image will become illuminated using the system described in FIG. 7 using a single pulse generator SPG, optocoupler strobe trigger OST and the high voltage strobe light pulse generator 13.

This method of using a bar code reader to trigger image illumination has distinct operational advantages over the other methods described in that it can reliably identify the reflector 4 as a unique reflection and ignore all other random reflections. A main disadvantage to this method, however, is that the cost of the standard bar code microprocessor is significantly greater than the electronics required for the other methods described.

Figure 9:
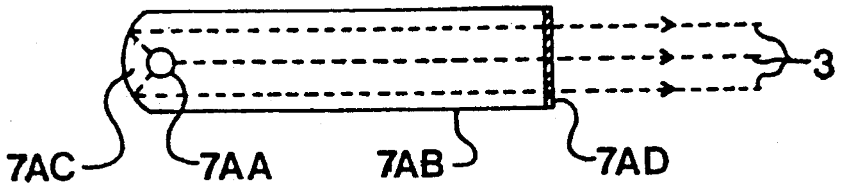
FIG. 9 is a diagrammatic plan view of an alternate coded signal source for installation inside an image display panel.

FIGS. 5, 8 and 9 illustrate the coded signal source 7A, the coded signal receiver/decoder 7B, the reflector array 4 and how these three components are arranged for the triggering of image illumination. The infrared light source 7A and the coded signal receiver/decoder 7B are both mounted within the image display panel 2. The coded signal receiver/decoder 7B was described in a previous paragraph and is the same for both embodiments presented. Within the coded signal source 7A particular to the embodiment illustrated in FIG. 6, infrared light is generated by an infrared light emitting diode 7AA. The coded signal 3 generated by the infrared light emitting diode 7AA is directed perpendicularly away from the image display panel 4 by a reflector 7AC placed behind the infrared light emitting diode 7AA. The shape of the reflector 7AC is elliptical in elevation, with the major axis oriented vertically, and parabolic in cross section. The infrared light emitting diode 7AA is placed at the focal point of the reflector 7AC so that infrared light illuminates an elliptical area on the side of the vehicle 1 approximately 30 mm wide and 80 mm high. The housing 7AB, at the back of which the reflector 7AC and the infrared phototransistor 7AA are mounted, is elliptical in section. The function of the housing 7AB is to restrict the direction that light can leave the coded signal source 7A. The interior of the housing 7BB is non-reflective to infrared light. A cover 7AD which is transparent to infrared light but opaque to visible light, is placed over the end opposite to the reflector 7AC to keep the interior of the coded signal source 7A clean. All the components which make up the coded signal source 7A are assembled so that they form a single module which can be removed, serviced and replaced as a single modular unit.

FIG. 10 schematically illustrates the simplest embodiment of the image display panel 2. The coded signal section 7A and 7B, and the illumination triggering section 13 are as described in a previous paragraphs and illustrated in either FIG. 1 or FIG. 6. Within the display section of the image display panel 2, light from the strobe lamp(s) 12A is directed onto the back of the transparent display image 16 by the strobe lamp reflector 12B located behind the strobe lamp(s) 12A and an upper reflector 12D located in the path of the light 15 and directly behind the transparent display image 16. The finish of the rear strobe lamp reflector 12B is like that of a good quality mirror and its shape is such that the light 15 from the strobe lamp(s) 12A illuminates the entire surface of the upper reflector 12D evenly. The finish of the upper reflector 12D is flat white so that the reflections 17 from it are diffuse and result in the even illumination of the entire back surface of the transparent display image 16.

The image can be seen through a cover sheet 9. Light from the interior of the vehicle 1 passes out through the vehicle's window 5 and will illuminate whatever is outside the window 5. When the vehicle 1 is in a tunnel where the walls of the tunnel 6 are relatively close to the window 5 the tunnel wall 5 is dimly illuminated by the light coming out through the window 5 of the vehicle 1. Because the tunnel wall 6 is illuminated an observer within the vehicle 1 looking out the window 5 can see the dimly lit tunnel wall 6. As the vehicle 1 passes by a series of image display panels 2 light from within the vehicle 1 will shine out through the windows 5 and cause the image display panels to be faintly visible from within the vehicle 1. The image display panels 2 will appear blurred to the observer because of the speed of the vehicle 1, but they will still be faintly visible. The faint visibility of the image display panels 2 would tend to distract the observer from his concentrated observation of the strobe light illuminated image (16 or 19). To minimize the visibility of the image display panels, which are illuminated by light coming from within the train, the housing of the image display panel 2 is painted black and the cover sheet 9 is made from a sheet of lightly tinted transparent plastic.

The transparent display image 16 is like that used in many advertising rear lit board displays. When lit from the rear, the images displayed on the transparent display image 16 are clear to an observer looking at its front side. The light source 12A, the back reflector 12B and the illumination triggering section are all contained within a module which can be easily removed and replaced.

FIG. 11 schematically illustrates the interior of an alternate manifestation of the image display panel 2. The coded signal section 7A and 7B, and the illumination triggering section 13 are as described in a previous paragraph. Within the display section, light 15 produced by the strobe lamp 12A shines onto the rear reflector 12B which directs it through a series of lenses 12C and onto the miniature transparent image or photographic slide 11. The light 15 passing through the miniature transparent image 11 is focused onto the display screen 8 by the focusing lenses 10. An observer in a passing vehicle can clearly see the projected image 19 on the display screen 8 through the lightly tinted transparent cover sheet 9, described in a previous embodiment. The display screen 8 is at a small angle relative to the vertical plane so that the projected image 19 can be seen by a passenger in the passing vehicle 1.

Steps must be taken to prevent the projected image 19 from being out of focus and distorted in an elongated fashion. The projected image 19 could potentially appear out of focus because one end of the display screen 8 is farther from the focusing lens 10 than the other. To correct this problem the miniature transparent image 11 is made to take on a small angle relative to the focusing lens 10. An additional effect of placing the display screen 8 at an angle is the potential elongation of the part of the projected image 19 farthest from the lens 10, and the potential contraction of the projected image 19 closest to the lens 10. The elongation and contraction of the projected image 10 can be eliminated by photographing the original undistorted image onto the miniature transparent image 11 in a pre-distorted fashion. The projected elongation effect is corrected by compressing the top of the photographed miniature transparent image 11 and expanding the bottom. The photographed elongation and contraction of the miniature transparent image 11 is done to the exact reverse proportions of the elongation and contraction of the projected image 19. Thus the projected image 19 is visible to the passenger of a passing vehicle 1 in a focused and undistorted fashion.

FIG. 12 schematically illustrates the interior of another alternate embodiment of the image display panel 2. The coded signal section 7A and 7B, and the illumination triggering section 13 are as described in a previous paragraph. Within the display section, light 15 produced by the strobe lamp(s) 12A shines horizontally onto the rear reflector 12B, through a series of lenses 12C and onto a miniature transparent image 11 placed at a small angle relative to the focusing lens 10. Light 15 passing through the miniature image 11 is focused by a lens system 10. The direction of the light 15 is changed by the flat reflective mirror 14 such that the light 15 is projected onto the angled display screen 8. An observer in a passing vehicle 1 can clearly see the projected image 19 on the display screen 8 through the cover sheet 9. This embodiment uses a lightly tinted cover sheet 9 as described in a previous embodiment.

The embodiment illustrated in FIG. 12 is similar to the one illustrated in FIG. 11 except that the arrangement of the components which make up the image display panel 2 can be made more compact and thus form a more cost effective design. Steps must be taken to ensure that the projected image 19 is focused and undistorted. The measures taken in the embodiment of FIG. 12 are similar to those taken in the embodiment of FIG. 11 in that the miniature transparent image 11 is placed at a small angle relative to the focusing lens 10 to obtain good focus and the miniature transparent image 11 is photographed in a pre-distorted fashion to obtain an undistorted projected image 19.

The light source 12A, the back reflector 12B, the lens systems 12C and 10, the miniature image 11, the mirror 14, and the illumination triggering section 13 are all contained within a module which can be removed easily and replaced.

The miniature transparent image 11 is similar in size to a photographic slide. A series of images can be easily and economically produced by photographing existing frames of video or motion picture film onto the miniature transparent image slides 11. A sequence of miniature transparent images 11 are then installed into a series of image display panels 2. A slot is provided in the front or side of each image display panel 2 so that the installation of the miniature transparent image 11 can be done quickly and easily without having to open or adjust any part or the image display panel 2. An observer will then be able to view a presentation similar to that seen by viewing the original motion picture film or video.

Miniature transparent image 11 can also be prepared using the more traditional approach of producing an animated motion picture film by photographing a series of drawn pictures.

At vehicle speeds of 50 km/hr and less, the horizontal spacing between image display panels 2 is less than the width of an image display panel 2. As the speed of the vehicle 1 increases the horizontal spacing between image display panels 2 is increased to produce the desired number of image illuminations per second (frames per second). The spacing between image display panels 2 can be fixed for any specific location along the travelled route of the vehicle 1 because the approximate speed of the vehicle 1 is set by speed limits and schedule. In other words each vehicle 1 which passes a specific image display panel 2 will pass at a predetermined speed. Thus the spacing between image display panels 2 at a specific location will be adjusted to coordinate with the usual speed of the vehicle 1 at that specific location thus giving the observer within the vehicle 1 a relatively uniform number of image illuminations per second (frames per second).

Along certain routes, which the vehicle 1 will travel, the speed of the vehicle 1 will be great enough that the spacing between image display panels 2 will be larger than the horizontal width of each panel. On these high speed routes there is an opportunity to place a second set of image display panels between the first set. The illumination of the first set of image display panel's 2 will be triggered by a triggering system, as described above, located at the top of the window 5 while the illumination of the second set of image display panels 2 will be triggered by a triggering system located at the bottom of the window 5. In the case of the bar code triggering system, also described above, the coding of the bar code reflector 4 would simply be altered in order that the first or second set of image display panels would be illuminated and the location of the bar code reflector 4 would stay the same at each window. Each window 5 on the vehicle 1 can be equipped with the appropriate trigger reflector 4 or light source 7A, located correctly so that the desired display would be observable through each window. The passenger on the vehicle would observe that one animated display was visible through some windows 5 and a separate and completely different animated display was visible through the remaining windows on the same side of the train.

In addition, image display panels 2 can be located on both sides of the vehicle 1 so that a passenger of the vehicle 1 will see an animated display from both sides of the vehicle 1.

While preferred embodiments of my invention have been described herein, various modifications may be made thereto without departing from the spirit and scope of my invention. Thus, it is to be understood that the present invention has been described by way of illustration only and that the scope of the invention is to be limited solely by the claims herein.

What I claim as my invention is:

1. An apparatus for displaying images for viewing from within a moving vehicle such as a subway train travelling in a darkened area including:

a plurality of image display devices for placement at uniform height alongside the route of the vehicle for displaying images, each image display device comprising an image display area, image illumination means for momentarily illuminating the image display area, coded light signal source means for emitting a coded light signal in the direction of an adjacent window of the vehicle, and light detector means for detecting a desired reflection of the coded light signal from the vehicle and triggering the image illumination means; and light reflection means for mounting on the vehicle in relationship to at least one of the windows of the vehicle to reflect said coded light signal from said coded light signal source means of each of the plurality of image display devices to their associated light detector means;

whereby continuous images are perceived by an observer from within the moving vehicle.

2. The apparatus as claimed in claim 1 including a plurality of light reflection means for mounting along the vehicle.

3. The apparatus as claimed in claim 1 wherein said coded light signal source means includes a means for emitting a continuous sequence of light pulses.

4. The apparatus as claimed in claim 1 wherein said light detector means includes an infrared detector.

5. The apparatus as claimed in claim 1 wherein said light reflection means is comprised of strips of material reflective at frequencies of light emitted by said coded light source means separated horizontally by strips which are less reflective at the frequencies of light emitted by said coded light source means.

6. The apparatus as claimed in claim 5 wherein the horizontal sequence and width of reflective and less-reflective strips is symmetrical in either horizontal direction.

7. The apparatus as claimed in claim 1 wherein said coded light signal source means includes a parabolic reflective housing for the light source, the diameter of the circumference of the housing being longer in the vertical axis than in the horizontal axis to provide a narrower cone of light in the direction of travel of the vehicle.

8. The apparatus as claimed in claim 1 wherein said light detector means triggers said image illumination means only after detection of a plurality of instances of the desired reflection of said coded light signal.

9. The apparatus as claimed in claim 8 wherein the plurality of instances is three.

10. The apparatus as claimed in claim 1 wherein said image illumination means further includes:

reflector means for reflecting the light from the image illumination means onto the image to be displayed.

11. The apparatus as claimed in claim 1 wherein said image illumination means further includes:

transparency holder means for holding an image transparency smaller in size than the image to be displayed on the image display area; and lens means for focusing light from said image illumination means through the image transparency onto the image display area;

whereby an enlarged focused image from the image transparency is displayed on the image display area.

12. The apparatus as claimed in claim 11 wherein said image illumination means further includes:

mirror means for reflecting light from the image transparency held in the transparency holder means onto the image display area.

13. The apparatus as claimed in claim 1 wherein said coded light signal source means includes a means for emitting digitally encoded light.

14. An apparatus for displaying images for viewing from within a moving vehicle such as a subway train travelling in a darkened area including:

coded light signal source means for mounting on the vehicle in relationship to at least one of the windows of the vehicle to emit a coded light signal generally perpendicularly away from the vehicle; and a plurality of image display devices for placement at uniform height alongside the route of the vehicle for displaying images, each image display device comprising;

an image display area, image illumination means for momentarily illuminating the image display area, and light detector means for detecting said coded light signal from the vehicle and triggering said image illumination means;

whereby continuous images are perceived by an observer from within the moving vehicle.

15. The apparatus as claimed in claim 14 including a plurality of coded light signal source means for mounting along the vehicle.

16. The apparatus as claimed in claim 14 wherein said coded light signal source means includes a means for emitting a continuous sequence of pulsed light.

17. The apparatus as claimed in claim 14 wherein said light detector means includes an infrared detector.

18. The apparatus as claimed in claim 14 wherein said coded light signal source means includes a parabolic reflective housing for the light source, the diameter of the circumference of the housing being longer in the vertical axis than in the horizontal axis to provide a narrower cone of light in the direction of travel of the vehicle.

19. The apparatus as claimed in claim 14 wherein said image illumination means further includes;

reflector means for reflecting the light from the image illumination means onto the image to be displayed.

20. The apparatus as claimed in claim 14 wherein said image illumination means further includes;

transparency holder means for holding an image transparency smaller in size than the image to be displayed on the image display area; and lens means for focusing light from said image illumination means through the image transparency onto the image display area;

whereby an enlarged focused image from the image transparency is displayed on the image display area.

21. The apparatus as claimed in claim 20 wherein said image illumination means further includes;

mirror means for reflecting light from the image transparency held in the transparency holder means onto the image display area.

22. The apparatus as claimed in claim 14 wherein said coded light signal source means includes a means for emitting digitally-encoded light.

* * * * *